(12) United States Patent
Kim

(10) Patent No.: US 6,271,993 B1
(45) Date of Patent: Aug. 7, 2001

(54) MODE DISCRIMINATING METHOD AND APPARATUS FOR CONTROLLING THE SWITCHING OF OPERATING MODES OF A MECHANISM

(75) Inventor: Ki-hong Kim, Suwon (KR)

(73) Assignee: Samsung Electronics Co., Ltd., Kyungki-Do (KR)

(*) Notice: Subject to any disclaimer, the term of this patent is extended or adjusted under 35 U.S.C. 154(b) by 0 days.

(21) Appl. No.: 09/545,809

(22) Filed: Apr. 10, 2000

Related U.S. Application Data

(63) Continuation of application No. 08/319,658, filed on Oct. 7, 1994.

(30) Foreign Application Priority Data

Dec. 31, 1993 (KR) .................................................. 93-32285

(51) Int. Cl.⁷ .................................................. G11B 5/008
(52) U.S. Cl. ............................................................ 360/137
(58) Field of Search .............................................. 360/137

(56) References Cited

U.S. PATENT DOCUMENTS

| | | | |
|---|---|---|---|
| 4,549,233 | 10/1985 | Teranishi et al. ................... | 360/137 |
| 4,674,001 | 6/1987 | Takahashi et al. ................... | 360/137 |
| 4,723,236 | 2/1988 | Kitami ................................... | 360/93 |
| 5,062,013 | 10/1991 | Gotoh .................................... | 360/90 |
| 5,079,665 | 1/1992 | Yang ...................................... | 360/93 |
| 5,172,283 | 12/1992 | Fukuyama et al. .................. | 360/137 |
| 5,969,900 | * 10/1999 | Shimizu ............................. | 360/96.3 |

* cited by examiner

*Primary Examiner*—A. J. Heinz
(74) *Attorney, Agent, or Firm*—Sughrue, Mion, Zinn, Macpeak & Seas, PLLC

(57) ABSTRACT

A mode discriminating method and apparatus for use in a deck mechanism for a video cassette tape recorder, which includes a motor for generating power for switching modes, a gear member rotated by the motor, and a slide member moved by the gear member. The slide member has an extending portion in which two cam grooves are formed. The apparatus further includes two switching devices which are interlocked into the cam grooves and a motor rotation detector for detecting the rotating direction of the motor, thereby reducing the number of switching elements for mode discrimination and simplifying the mechanism.

12 Claims, 3 Drawing Sheets

1ST SWITCHING SIGNAL(S1)

2ST SWITCHING SIGNAL(S2)

MOTOR ROTATION SIGNAL(SM)

MODE DISCRIMINATING METHOD AND APPARATUS FOR CONTROLLING THE SWITCHING OF OPERATING MODES OF A MECHANISM

This is a continuation of application Ser. No. 08/319,658 filed Oct. 7, 1994, the disclosure of which is incorporated herein by reference.

BACKGROUND OF THE INVENTION

The present invention relates to a mode discriminating method and apparatus for controlling the switching of operating modes of a tape recorder and other various mechanisms which selectively perform diverse functions, and more particularly, to a mode discriminating method and apparatus which discriminates an operating mode to be switched by adopting as one factor the rotating direction of a driving source (motor) driven during mode switching.

For instance, a video tape cassette recorder (VCR) for recording/reproducing information with a video cassette tape includes a cassette loading mechanism for loading a cassette and a deck mechanism for driving a tape of the loaded cassette. In a specific video tape cassette recorder, when a cassette is inserted, the cassette is conveyed to a deck mechanism of the recorder from the insertion slot. With the cassette seated on the deck mechanism, the tape is drawn out from the cassette and then loaded onto a recording/reproducing head drum. Thereafter, an operation such as recording or playback, which is selected by a user, is carried out.

In such a VCR, a conventional deck mechanism for switching operating modes is, as shown in FIG. 1, equipped with a motor 1 for generating power to switch operating modes, a master gear 2 rotatively driven by motor 1, a main slide 3 connected to move in accordance with the rotation of master gear 2, and a rotary mode detecting switch 4 installed on the same axis as that of master gear 2. Here, master gear 2 and main slide 3 interlock with other unshown gears and levers according to the rotation of master gear 2 and the movement of main slide 3 so as to switch the operating state, i.e., an operating mode of the mechanism. Mode detecting switch 4 detects a switched operating mode according to the rotating position of master gear 2, as disclosed in U.S. patent application Ser. No. 08/087,332 filed on Jul. 8, 1993.

Mode detecting switch 4, as shown in FIG. 1, bears a conductive pattern 5 formed on a plurality of concentric circles, a contact slider 6 which is provided on the conductive pattern and rotates with master gear 2 for slidable contact with the pattern, and a plurality of terminals 7. Mode detecting switch 4 outputs a plurality of switch signals indicative of an operating mode of the mechanism from terminals 7 and therefore provides information on the operating mode to microprocessor 8 for controlling the whole mechanism including motor 1. Microprocessor 8 is connected to key input 9 which is manipulated by a user so as to operate motor 1 according to the signal of the key input, and to stop the motor once the mechanism has been switched to the selected mode. As discussed above, in the conventional mechanism, rotary mode detecting switch 4 is used to detect and discriminate the operating mode of the deck mechanism with the plurality of switching signals so as to control the switching of operating modes.

In general, the number of modes detectable by a switching device is $2^n$ (where n is an integer representing the number of switching elements). For example, eight ($2^3$) modes can be detected with three switching elements. A switching element is a switching contact. The individual concentric circles in conductive pattern 5 are the switching elements, and there may be more than one switching element on each concentric circle. The mode detecting switch 4 requires at least four conductive patterns including a common electrode and accordingly, the corresponding number of terminals.

Thus, the detection capability of the conventional mode detecting switch 4 has a limit in practice. For a multifunctional deck mechanism, many conductive patterns and terminals are required, which complicates its structure accordingly. The rate of defective products is higher due to the increased number of switching elements, resulting in numerous errors in mode detection.

In order to detect more modes, the addition of other switching elements as well as increasing the amount of conductive patterns can be considered. However, this is undesirable because the addition of switching elements raises production cost and makes their arrangement more difficult.

SUMMARY OF THE INVENTION

Therefore, it is an object of the present invention to provide a mode discriminating method and apparatus in which the number of switching elements of a mode detecting switch is significantly reduced.

It is another object of the present invention to provide a mode discriminating method and apparatus in which the configuration of a tape driving deck mechanism is simplified.

To accomplish the objects of the present invention, there is provided a mode discriminating method for discriminating the operating mode of a mechanism having a forwardly and reversely rotatable motor for generating power to switch operating modes, the method comprising the steps of: detecting at least one switching signal according to a switched mode of the mechanism; detecting a motor rotation signal indicative of the rotating direction of the motor; and combining the switching signal and motor rotation signal and reading the switched mode of the mechanism.

To accomplish the objects of the present invention, there is provided a mode discriminating apparatus for discriminating the operating mode of a mechanism having a forwardly and reversely rotatable motor for generating power to switch operating modes, the apparatus comprising: a circuit for detecting at least one switching signal according to a switched mode of the mechanism; a circuit for detecting a motor rotation signal indicative of the rotating direction of the motor; and a circuit for combining the switching signal and motor rotation signal and reading the switched mode of the mechanism.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
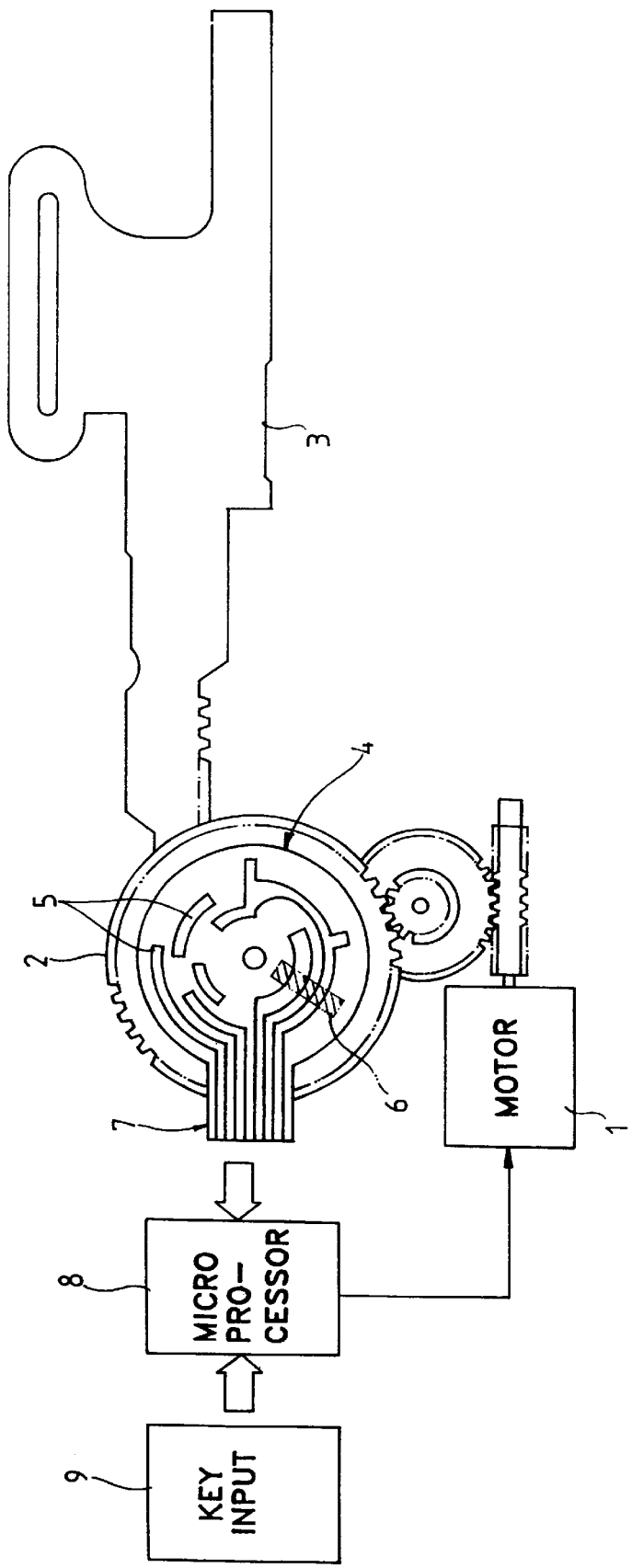
FIG. 1 illustrates a device and associated circuits for discriminating an operating mode of a deck mechanism of a conventional video tape cassette recorder.
Figure 2:
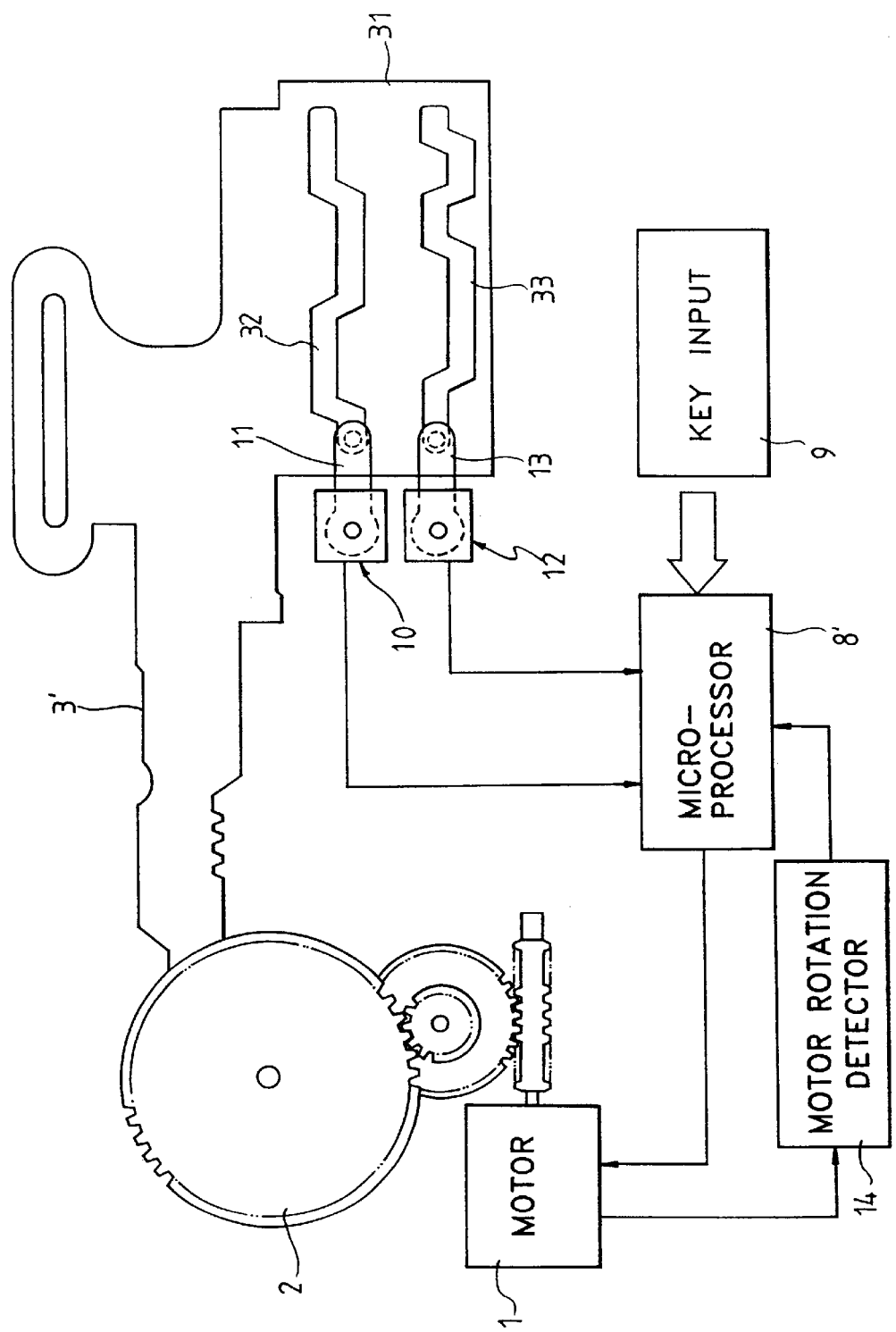
FIG. 2 illustrates a preferred embodiment of a mode discriminating method and apparatus of the present invention.

In FIG. 2, reference numeral 1 indicates a forwardly and reversely rotatable motor for generating power to switch modes. Reference numeral 2 is a gear member rotatively driven by motor 1. Reference numeral 3' is a slide member rectilinearly moving in accordance with the rotation of gear member 2. As motor 1 is driven and gear member 2 is then rotated, slide member 3' rectilinearly moves so that the apparatus is in a state in which different operating modes can be performed according to the rotation or degree of movement of the members.

In the embodiment, slide member 3' possesses an extending portion 31 extended on one side, and two cam grooves 32 and 33 are formed lengthwise in the extending portion 31 and have a prescribed displacement section. Two switching elements 10 and 12 are installed to be interlocked into cam grooves 32 and 33 so as to attain two different switching signals according to an operating mode of the mechanism. The switching elements 10 and 12 each have a switching lever 11 and 13, respectively, inserted into cam groove 32 and 33, respectively. The switching levers 11 and 13 move within their respective displacement sections so as to generate respective switching signals switched according to the individual movement of each switching lever.

The apparatus of the present invention further contains a motor rotation detector 14 for detecting a motor rotation signal indicative of the rotating direction of motor 1. Motor rotation detector 14 outputs the motor rotation signal which is, for instance, a high signal H during forward rotation and a low signal L during reverse rotation. Motor rotation detector 14 can be constructed with a simple circuit which detects the rotating direction of the motor either according to the direction (polarity) of current applied to a lead (not shown) of motor 1, or according to a motor driving instruction from microprocessor 8'. The detailed configuration of the circuit will be omitted herein.

Microprocessor 8' is used to run a predetermined program according to a signal output from key input 9, discriminate an operating mode by combining and analyzing the switching signals read out from switching elements 10 and 12 and the motor rotation signal read out from motor rotation detector 14, and appropriately control motor 1.

In the preferred embodiment of the present invention, as the signal according to a user-selected mode is transmitted from key input 9, microprocessor 8' determines the rotating direction of motor 1 according to the selected mode and drives motor 1 in one direction. This switches the operating mode of the mechanism, via gear member 2 which is rotated by motor 1 and slide member 3' which is moved by gear member 2. Here, as respective switching levers 11 and 13 of switching elements 10 and 12 are moved along cam grooves 32 and 33 formed in extending portion 31 of slide member 3', the switching signals are output from the respective switching elements 10 and 12. Motor rotation detector 14 detects the motor rotation signal indicative of the rotating direction of motor 1. Based upon the respective switching signals of switching elements 10 and 12 and the motor rotation signal of motor rotation detector 14, microprocessor 8' reads the current mode of the mechanism, and stops motor 1 when the indicated mode matches that selected by the user.

Figure 3A:
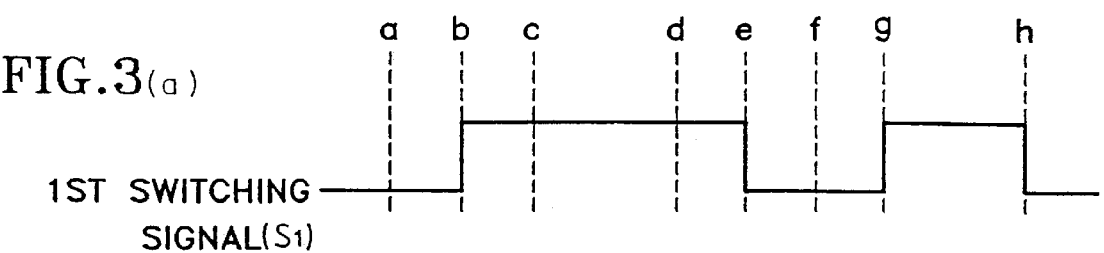
FIG. 3 is a timing chart to explain an example of the signal processing according to the preferred embodiment of a mode discriminating method and apparatus of the present invention.
Figure 3B:
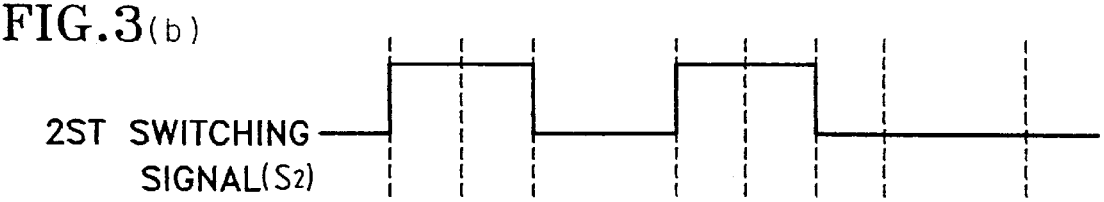
Figure 3C:
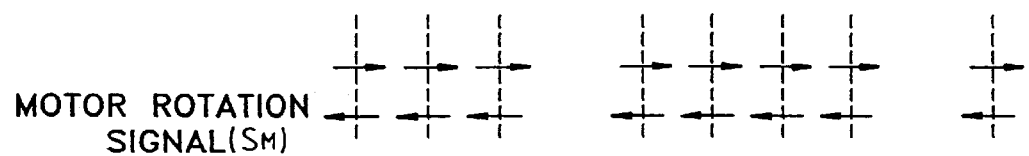

FIG. 3 illustrates an example of the signal processing of respective switching signals $S_1$ and $S_2$ of switching elements 10 and 12, whose levels are determined depending upon the tracks of cam grooves 32 and 33, and motor rotation signal $S_M$ of motor rotation detector 14. Here, the forward rotation of motor 1 is indicated by an arrow pointing to the right. Conversely, an arrow pointing to the left indicates reverse motor rotation.

The following table illustrates mode discrimination in accordance with the signal processing example of FIG. 3.

| motor rotation signal $S_M$ | switching signal ($S_1$) level | switching signal (S2) level | mode s |
|---|---|---|---|
| forward rotation | L | L→H | mode a |
|  | L→H | H | mode b |
|  | H | H→L | mode c |
|  | H | L→H | mode d |
|  | H→L | H | mode e |
|  | L | H→L | mode f |
|  | L→H | L | mode g |
|  | H→L | L | mode h |
| reverse rotation | H←L | L | mode h |
|  | L←H | L | mode g |
|  | L | H←L | mode f |
|  | H←L | H | mode e |
|  | H | L←H | mode d |
|  | H | H←L | mode c |
|  | L←H | H | mode b |
|  | L | L←H | mode a |

For instance, if switching signal $S_2$ goes from low (L) to high (H) when the rotation of motor 1 is forward and the logic level of switching signal $S_1$ is low, the mechanism's mode is determined to be "mode a." In this state (forward motor rotation and a low switching signal $S_1$), if switching signal $S_2$ goes from high to low, the mechanism's mode is set as "mode f."

Further, if the motor is reversely rotated and the logic level of switching signal $S_1$ is low, whenever switching signal $S_2$ goes from low to high, the mechanism's mode is set as "mode f." In the same state as above, if switching signal $S_2$ goes from high to low, the mechanism's mode is set as "mode a." In detecting eight modes, only two switching elements are used in this invention while the conventional apparatus requires three switching elements.

As described above, since the number of switching elements is reduced, the present invention simplifies the mechanism and decreases the production cost thereof. Further, this invention provides for automated fabrication of a mechanism because the switching elements can be disposed on a printed circuit board. In addition, the rate of malfunction due to poor contact is lowered, due to the reduced number of switching elements.

Although the invention has been described with reference to specific embodiments, this description is not meant to be construed in a limiting sense. Various modifications of the disclosed embodiment, as well as other embodiments of the present invention, will become apparent to persons skilled in the art upon reference to the decription of the invention. It is therefore contemplated that the appended claims will cover any such modifications or embodiments as fall within the true scope of the invention.

What is claimed is:

1. A mode discriminating method for discriminating an operating mode of a mechanism having a forwardly and reversely rotatable motor for generating power to switch operating modes, said method comprising:

detecting at least one switching signal according to a switched mode of said mechanism;

detecting a motor rotation signal indicative of the rotating direction of said motor; and combining said switching signal and motor rotation signal in a control circuit to determine the switched mode of said mechanism.

2. The mode discriminating method as claimed in claim 1, wherein said mode discriminating method is capable of distinguishing between 2n operating modes by using only n−1 switching signals.

3. The mode discriminating method as claimed in claim 1, wherein, when said motor rotation signal has a first value, said motor rotation signal indicates that said motor is rotating in a first direction, and wherein, when said motor rotation signal has a second value, said motor rotation signal indicates that said motor is rotating in a second direction.

4. A mode discriminating apparatus for discriminating the operating mode of a mechanism having a forwardly and reversely rotatable motor for generating power to switch operating modes, said apparatus comprising:

means for defecting at least one switching signal according to a switched mode of said mechanism;

means for detecting a motor rotation signal indicative of the rotating direction of said motor; and means for combining said switching signal and said motor rotation signal to determine the switched mode of said mechanism, wherein said means for combining comprises a control circuit which combines said switching signal and said motor rotation signal.

5. The mode discriminating apparatus as claimed in claim 4, wherein said mode discriminating apparatus is capable of distinguishing between 2n operating modes by using only n−1 switching signals.

6. The mode discriminating apparatus as claimed in claim 4, wherein, when said motor rotation signal has a first value, said motor rotation signal indicates that said motor is rotating in a first direction, and wherein, when said motor rotation signal has a second value, said motor rotation signal indicates that said motor is rotating in a second direction.

7. A mode discriminating apparatus for discriminating the operating mode of a mechanism having a forwardly and reversely rotatable motor for generating power to switch operating modes, said apparatus comprising:

a switching signal detector for detecting a switched mode of the mechanism and generating at least one switching signal which indicates said switched mode of the mechanism;

a motor rotation direction detector for detecting a rotating direction of the motor and generates a motor rotation signal which represents the rotating direction of the motor;

a microprocessor which combines said switching signal and said motor rotation signal from said switching signal detector and said motor rotation direction detector to thereby determine the switched mode of said mechanism.

8. The mode discriminating apparatus as claimed in claim 7, wherein said mode discriminating apparatus is capable of distinguishing between 2n operating modes by using only n−1 switching signals.

9. The mode discriminating apparatus as claimed in claim 7, wherein, when said motor rotation signal has a first value, said motor rotation signal indicates that said motor is rotating in a first direction, and wherein, when said motor rotation signal has a second value, said motor rotation signal indicates that said motor is rotating in a second direction.

10. A mode discriminating apparatus for discriminating the operating mode of a mechanism having a forwardly and reversely rotatable motor for moving a slider to switch operating modes, said apparatus comprising:

a position detector for detecting a position of the slider and generating at least one position signal which indicates the position of the slider;

a motor rotation direction detector for detecting a rotating direction of the motor and generating a motor rotation signal which represents the rotating direction of the motor;

a control circuit which combines said position signal and said motor rotation signal to determine an operating mode of said mechanism.

11. The mode discriminating apparatus as claimed in claim 10, wherein said mode discriminating apparatus is capable of distinguishing between 2n operating modes by using only n−1 position signals.

12. The mode discriminating apparatus as claimed in claim 10, wherein, when said motor rotation signal has a first value, said motor rotation signal indicates that said motor is rotating in a first direction, and wherein, when said motor rotation signal has a second value, said motor rotation signal indicates that said motor is rotating in a second direction.

* * * * *